J. LAUDE.
Seed-Planter.
No. 204,983. Patented June 18, 1878.
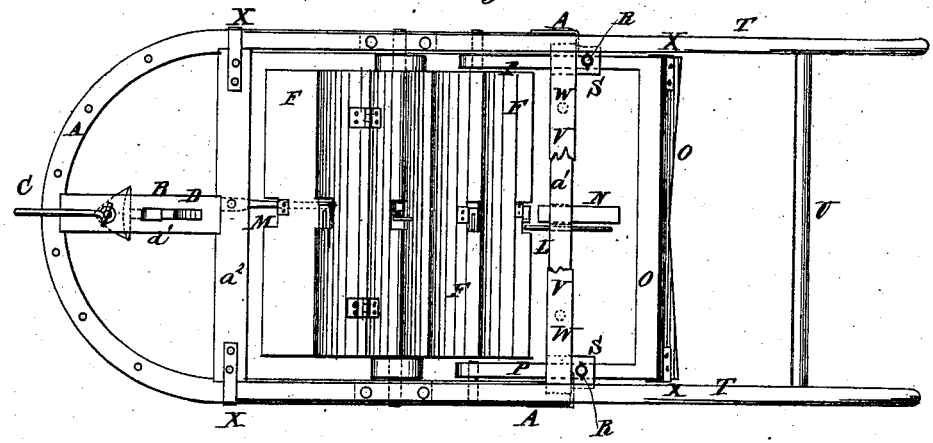
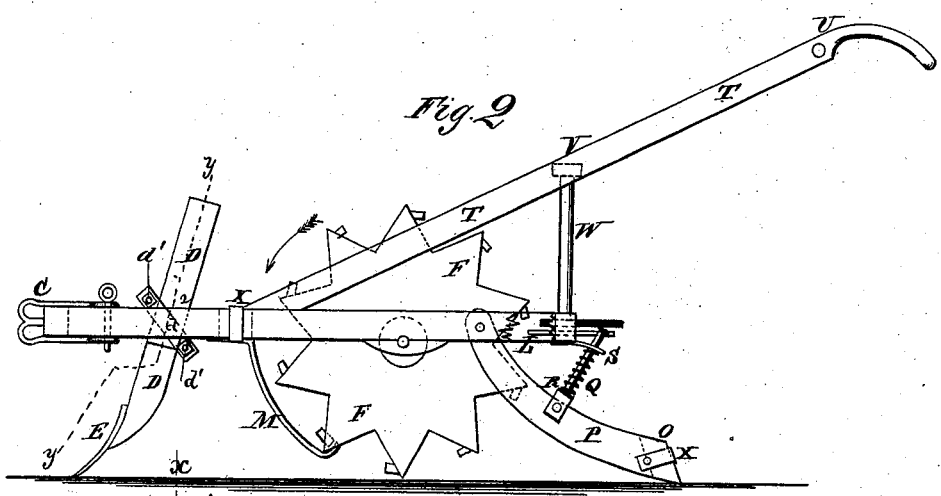
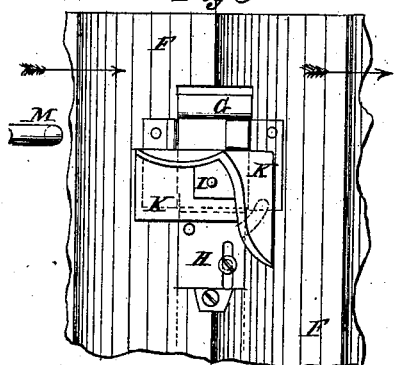
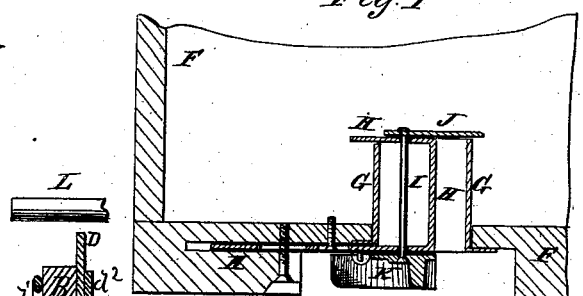
WITNESSES:
A.W. Almqvist
C. Sedgwick
INVENTOR:
J. Laude
BY
ATTORNEYS.
N. PETERS, PHOTO-LITHOGRAPHER, WASHINGTON, D.C.

UNITED STATES PATENT OFFICE.

JOSEPH LAUDE, OF MONTICELLO, ARKANSAS.

IMPROVEMENT IN SEED-PLANTERS.

Specification forming part of Letters Patent No. 204,983, dated June 18, 1878; application filed January 9, 1878.

*To all whom it may concern:*

Be it known that I, JOSEPH LAUDE, of Monticello, in the county of Drew and State of Arkansas, have invented a new and useful Improvement in Seed-Planters, of which the following is a specification:

Figure 1 is a top view of my improved planter, part being broken away to show the construction. Fig. 2 is a side view of the same, part being broken away to show the construction. Fig. 3 is a face view of the dropping device enlarged. Fig. 4 is a cross-section of the same, taken through the line $x$ $x$, Fig. 3. Fig. 5 is a detail section taken through the line $y$ $y$, Fig. 2.

Similar letters of reference indicate corresponding parts.

The object of this invention is to furnish an improved machine for planting cotton, corn, pease, and other seeds, which shall be so constructed as to plant the seeds regularly and uniformly, which may be adjusted to plant more or less corn and pease to a hill, which will plant the seed to the end of the row, and will not catch upon stumps, &c., and which shall be simple in construction, light, strong, and durable.

The frame consists of a bar, A, bent into U form, and connected at its ends and at the beginning of its bend by cross-bars $a^1$ $a^2$. To the centers of the bend of the bar A and the front cross-bars $a^2$ are attached the ends of the draw-bar B, to the forward end of which is attached the clevis C. To the middle part of the draw-bar B is attached the standard D, to the lower end of which is attached the plow E, to open a furrow to receive the seed, and which is secured in place adjustably by the bow $d^1$ and the yoke $d^2$, which pass diagonally around the said draw-bar and standard. By this construction, by loosening the nuts of the clips $d^1$ $d^2$, the opening-plow D E may be adjusted forward or rearward, upward or downward, as may be required.

The standard D is made with a shoulder or offset to bring its lower part and its plow in line with the center of the draw-bar B. The standard D is set edgewise to prevent grass and weeds from catching upon it. For the same reason the plow E has its upper corners cut off, or is made diamond-shaped.

To the middle part of the parallel arms of the bar A are attached bearings, in which revolve the journals of the drum E. The face of the drum E is formed of a series of projecting angles, as shown in Figs. 1 and 2. In the center of each of the angles of the drum F is formed a hole, in which is secured a box, G, open at both ends to receive the seed and drop it to the ground.

H is a strip of band-iron, which is bent twice at right angles, and is made with unequal arms. The shorter arm of the strip H rests upon the inner end of the box G, and its longer arm is inserted in a slit in the angle of the drum F, and has slots formed in it to receive the screws by which it is secured in place, so that by loosening the said screws the strips H may be adjusted to gage the size of the cavity of the box G.

I is a bolt, which passes through the arms of the gage H near its angles, and to the inner end of which is rigidly attached a plate, J, made of such a size that when turned in one direction it may cover the inner end of the box G, and when turned one-quarter around may uncover the inner end of said box to admit the seed. To the outer end of the bolt or rod I is attached a plate, K, which is made of such a size that when turned into one position it may cover the outer end of the box G, and when turned one-quarter around it may uncover said box and allow the seed to escape. Upon the outer side of the plate K is formed a right-angled flange, the arms of which are slightly curved, as shown in Fig. 3. To the rear cross-bar $a^1$ of the frame is attached a rod or bar, L, the inner end of which projects into such a position that as the drum F revolves it will strike the flange of the plate K and turn it so as to cover the outer end of the box G and uncover its inner end, allowing it to become filled with seed. To the forward cross-bar $a^2$ of the frame is attached a rod or bar, M, which is curved downward and rearward into such a position that as each angle of the drum F approaches the ground it will strike the flange of the plate K and turn it, uncovering the outer end of the box G and covering the inner end of the said box, so that the seed contained in the box, and no more, may drop to the ground.

In a hole in the rear cross-bar $a$ of the frame is inserted a bar, N, which, when the machine is used for planting cotton-seed, may be moved forward to remove any soil that may stick in the notch in the angle of the drum F, and which might prevent the seed from escaping.

The seed is covered by the bar or block O, the lower edge of which is concaved to round up the top of the ridge, and its ends are attached to the rear ends of the curved side bars P. The upper ends of the bars P are pivoted to the rear part of the arms of the bar A.

The coverer is held down to its work by the spiral springs Q placed upon the guide-rods R, with their lower ends resting against shoulders formed upon the said rods, and with their upper ends resting against the bars S, through holes in which the upper ends of the said rods R pass. The lower ends of the rods R are pivoted to the curved bars P.

T are the handles, the lower ends of which are attached to the forward part of the arms of the bar A. The handles T are connected near their upper ends by the round U, and at their middle parts by the bar V, to which are attached the upper ends of the uprights W, that support said handles, and the lower ends of which are attached to the rear cross-bar $a^1$.

The points of intersection of the cross-bars $a^1$ $a^2$ with the bar A, and of the covering-bar O with the curved bars P, are strengthened by pieces X, of band-iron, attached to them, as shown in Figs. 1 and 2.

Having thus described my invention, I claim as new and desire to secure by Letters Patent—

The combination of the adjustable gages H, the bolt I, the inner plate J, the outer flanged plate K, and the rods L M with the box G, inserted in the angles of the drum F, and with the frame A $a^1$ $a^1$, substantially as herein shown and described.

JOSEPH LAUDE.

Witnesses:
GEORGE H. PREDDY,
JOHN M. HEROD.